Patented Aug. 19, 1941

2,252,844

UNITED STATES PATENT OFFICE 2,252,844

AZO DYESTUFFS INSOLUBLE IN WATER

Ernst Fischer, Offenbach-on-the-Main, and Ernst Heinrich, Frankfort-on-the-Main-Fechenheim, Germany, assignors to General Aniline & Film Corporation, a corporation of Delaware No Drawing. Application July 29, 1939, Serial No. 287,254. In Germany August 6, 1938

1 Claim. (Cl. 260—204)

Our present invention relates to azodyestuffs insoluble in water, which are characterized by the valuable property that they yield when produced on vegetable fibers valuable dyeings and printings which possess a good fastness to boiling, soaping and washing and a very good fastness to light.

More particularly the present invention relates to the azodyestuff of the general formula:

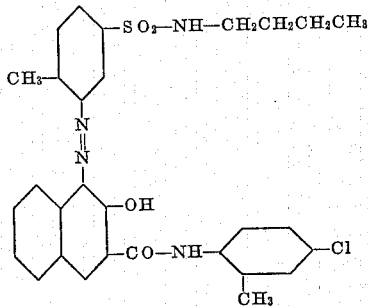

The new dyestuffs are obtained by impregnating vegetable fibers according to the usual methods with a 2-3-hydroxy-naphthoic acid arylamide of the formula:

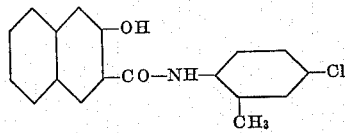

and combining this compound on the fiber with a diazo compound of an amine of the following formula:

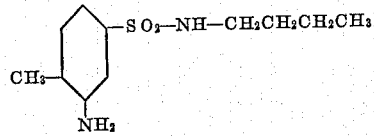

The dyeings and printings thus obtained are distinguished by clear bright shades and by a good fastness particularly by a very good fastness to light.

In order to further illustrate our invention the following example is given, the parts being by weight and all temperatures in degrees centigrade.

EXAMPLE 50 g. of boiled cotton yarn are treated with the impregnating bath (a) for half an hour, then freed from the adhering liquid by winding, squeezing or centrifuging and, while wet, dyed in the developing bath (b) for half an hour. Then the dyed goods is rinsed, soaped at the boil, rinsed once more and dried.

*Impregnating bath (a)*

4 grams of 1-(2'3'-hydroxynaphthoylamino)-2-methyl-4-chlorobenzene 6 ccs. of caustic soda lye of 34° Bé., 4 ccs. of Turkey red oil of 50% strength and 2 ccs. of formaldehyde of 30% strength are dissolved in about 500 ccs. of boiling water. Then the solution is made up to 1 liter by the addition of water.

*Developing bath (b)*

2.4 grams of 1-methyl-2-aminobenzene-4-sulfonic acid n-butylamide of the formula:

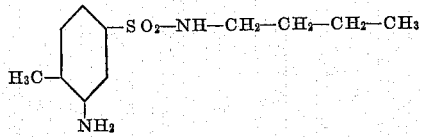

are diazotized in the usual manner with 0.7 g. of sodium nitrite and 2.8 ccs. of hydrochloric acid of 22° Bé. To the diazo solution obtained 2.5 g. of sodium acetate and a solution of 25 g. of sodium chloride in water are added and the solution is made up to 1 liter.

In the above described manner bright bluish red shades of good fastness to washing and boiling and very good fastness to light are obtained.

The dyestuff, thus produced on the fiber, corresponds to the formula:

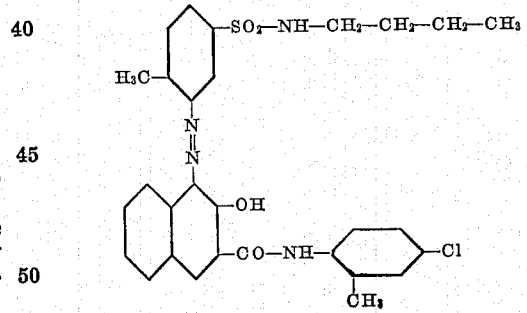

We claim:
The azodyestuff of the formula:
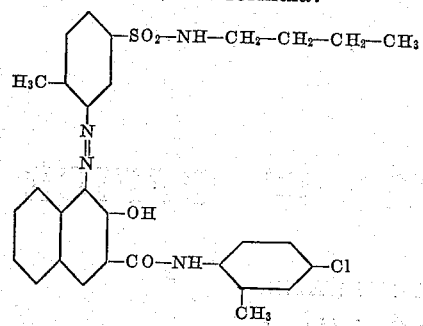
which dyestuff yields when prepared on the vegetable fiber clear bluish red shades of good fastness to washing and boiling and very good fastness to light.
ERNST FISCHER.
ERNST HEINRICH.